(12) United States Patent
Kitano et al.

(10) Patent No.: US 8,575,898 B2
(45) Date of Patent: Nov. 5, 2013

(54) CHARGING CIRCUIT, CHARGING APPARATUS, ELECTRONIC EQUIPMENT AND CHARGING METHOD

(75) Inventors: Mayo Kitano, Kasugai (JP); Masatoshi Kokubun, Kasugai (JP)

(73) Assignee: Spansion LLC, Sunnyvale, CA (US)

( * ) Notice: Subject to any disclaimer, the term of this patent is extended or adjusted under 35 U.S.C. 154(b) by 644 days.

(21) Appl. No.: 12/697,879

(22) Filed: Feb. 1, 2010

(65) Prior Publication Data

US 2010/0194352 A1    Aug. 5, 2010

(30) Foreign Application Priority Data

Feb. 2, 2009   (JP) ................................. 2009-021574

(51) Int. Cl.
*H02J 7/00*   (2006.01)
*H02J 7/14*   (2006.01)

(52) U.S. Cl.
USPC ............ 320/134; 320/136; 320/135; 320/132

(58) Field of Classification Search
USPC ......... 320/134, 136, 162, 135, 132, 137, 128, 320/127, 129
See application file for complete search history.

(56) References Cited

U.S. PATENT DOCUMENTS

| | | | | |
|---|---|---|---|---|
| 7,274,171 B2 * | 9/2007 | Nishida et al. | ................ | 320/137 |
| 7,276,881 B2 * | 10/2007 | Okumura et al. | ............. | 320/134 |
| 7,977,916 B2 * | 7/2011 | Hayakawa | .................... | 320/134 |
| 2005/0269992 A1 * | 12/2005 | Lai et al. | ....................... | 320/134 |
| 2007/0188148 A1 * | 8/2007 | Kawasumi et al. | ........... | 320/134 |
| 2009/0001935 A1 * | 1/2009 | Odaohhara | .................... | 320/134 |
| 2009/0045775 A1 * | 2/2009 | Popescu Stanesti et al. | . | 320/126 |
| 2009/0096399 A1 * | 4/2009 | Chen et al. | .................... | 318/441 |
| 2009/0174366 A1 * | 7/2009 | Ahmad et al. | ................ | 320/114 |

FOREIGN PATENT DOCUMENTS

JP        2002-078228 A    3/2002

* cited by examiner

*Primary Examiner* — Edward Tso
*Assistant Examiner* — Alexis Boateng
(74) *Attorney, Agent, or Firm* — Sterne, Kessler, Goldstein & Fox P.L.L.C.

(57) ABSTRACT

A charging circuit includes a monitoring part configured to monitor a battery voltage applied to a battery and configured to output an overvoltage signal when the battery is in an overvoltage condition a protection part configured to electrically disconnect the battery from an adaptor when receiving the overvoltage signal, and a switch which, when the battery is electrically disconnected from the adaptor, switches a monitoring node for an adaptor voltage outputted from the adaptor, from a supply node of the battery voltage to a supply node of a system voltage, which is applied to a system electrically connected with the battery and the adaptor, based on the overvoltage signal to cause a control command for controlling the adaptor voltage based on the system voltage to be outputted.

8 Claims, 9 Drawing Sheets

CHARGING CIRCUIT, CHARGING APPARATUS, ELECTRONIC EQUIPMENT AND CHARGING METHOD

CROSS-REFERENCE TO RELATED APPLICATIONS

This application is based upon and claims the benefit of priority of the prior Japanese Patent Application No. 2009-021574 filed on Feb. 2, 2009, the entire contents of which are incorporated herein by reference.

FIELD

An embodiment discussed herein relates to a charging circuit, a charging apparatus, electronic equipment, and a charging method.

BACKGROUND

Typically, portable electronic equipment such as a notebook type personal computer is equipped with a battery (also called a secondary battery and storage battery) as a separate power supply dedicated for the equipment so that the equipment may operate as a single unit without being electrically connected to a receptacle of an external power source (commercial power supply) with an adaptor (AC adaptor). Moreover, in an environment in which an external power source is available, such as at a home, generally, such portable electronic equipment is not activated by a power supply having a limited power capacity, i.e. a battery, but is activated by being electrically connected to the external power source through an adaptor with the battery being attached to the electronic equipment so that alternating voltage acquired from the external power source is converted into direct-current voltage by an AC adaptor to obtain electric power.

For that purpose, electronic equipment of this type is provided with a charging apparatus which, when the equipment is linked to an external power source through an adaptor, charges a battery by the power of the external power source while the equipment is powered by the external power source. In a charging apparatus of this type, a problem may arise in that if an overcurrent flows from the adaptor side to the battery side, this overcurrent causes damage to the battery leading to battery degradation. Accordingly, it is contemplated that the current flowing to the battery side is fed back to the adaptor side to control the current flowing to the battery (for example, Japanese Patent Laid-Open No. 2002-78228). This arrangement reduces the tendency of an overcurrent to flow to the battery, thereby enabling to extend the battery life.

In this kind of electronic equipment, there may be a case in which the system load suddenly changes, such as when a function used theretofore is deactivated, for example, when a motor rotating a disk is stopped. In a typical battery, even if the responsiveness of the control loop of the battery side is increased (sped up), because of the fact that the response speed of the AC adaptor side may not follow it, the responsiveness of charging voltage during a sudden change of system load is likely to be such that an overshoot and undershoot take place in the charge voltage. Therefore, such responsiveness may cause an overvoltage to be supplied to the battery leading to a problem of battery degradation. Thus, for example, in lithium ion batteries, which are widely used as such battery in recent years, this kind of overshoot particularly has an influence on the battery degradation.

SUMMARY

According to an aspect of the embodiment, a charging circuit includes a monitoring part configured to monitor a battery voltage applied to a battery and configured to output an overvoltage signal when the battery is in an overvoltage condition a protection part configured to electrically disconnect the battery from an adaptor when receiving the overvoltage signal, and a switch which, when the battery is electrically disconnected from the adaptor, switches a monitoring node for an adaptor voltage outputted from the adaptor, from a supply node of the battery voltage to a supply node of a system voltage, which is applied to a system electrically connected with the battery and the adaptor, based on the overvoltage signal to cause a control command for controlling the adaptor voltage based on the system voltage to be outputted.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereafter, an embodiment will be described with reference to FIGS. 1 to 6.

Figure 1:
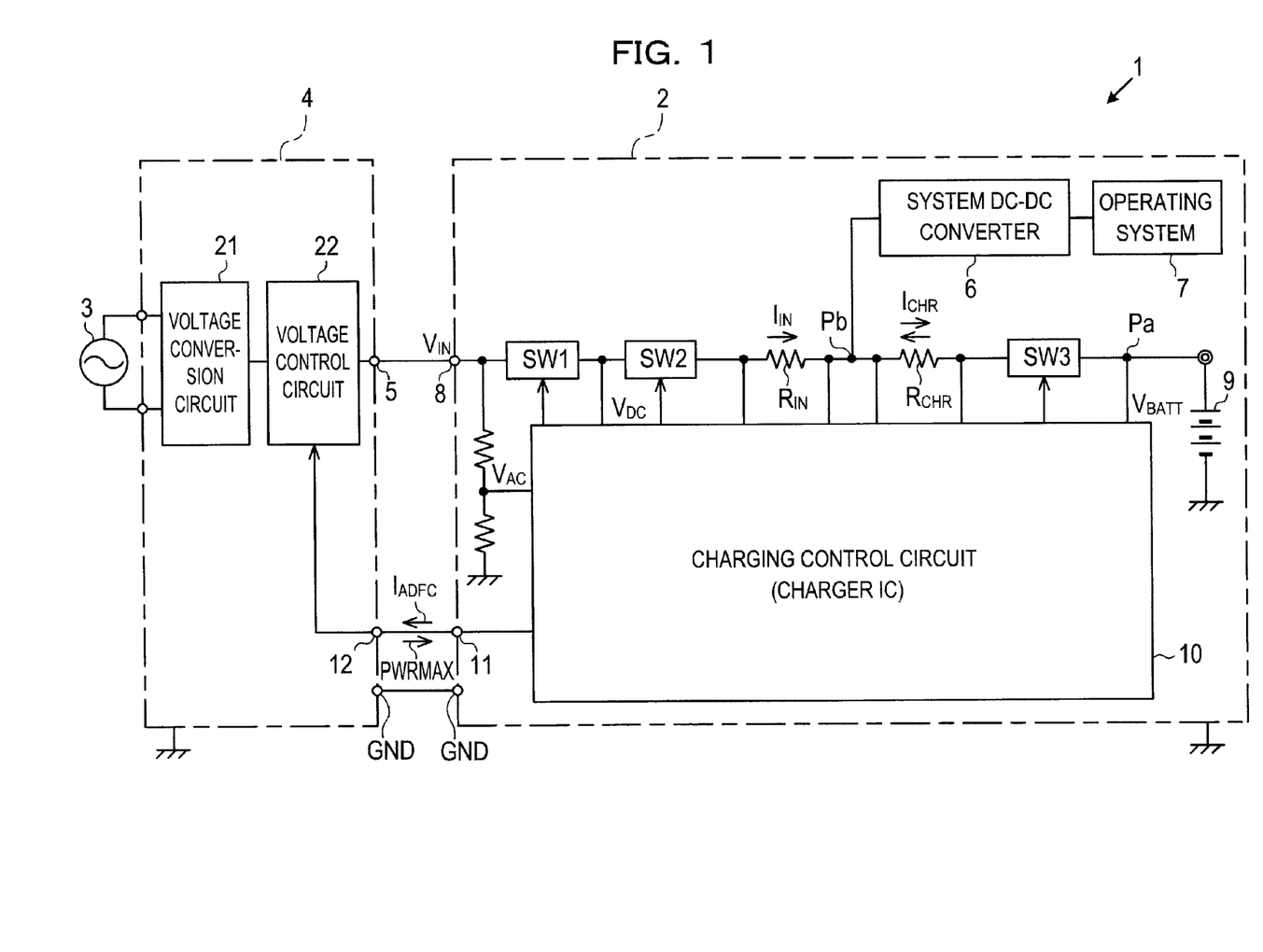
FIG. 1 illustrates electronic equipment to which a first embodiment is applied.

As illustrated in FIG. 1, in an electronic system 1 such as, for example, a notebook type personal computer, electronic equipment 2 is provided as a main body of the system 1. The electronic equipment 2 is configured to be connectable to an external power source (alternating power supply) 3 which may output, for example, an alternating voltage, such as a commercial power supply, via an AC adaptor 4 which supplies as a connection cable. The AC adaptor 4 converts the alternating voltage acquired from the external power source 3 into a rated direct-current voltage which is needed for the operation of the electronic equipment 2, and outputs the direct-current voltage from a voltage output terminal 5 of its own as an adaptor voltage $V_{IN}$ toward the electronic equipment 2. It is noted that the AC adaptor 4 corresponds to the adaptor.

The electronic equipment 2 is provided with a system DC-DC converter 6 which may adjust the direct-current voltage acquired from the AC adaptor 4 to be a predetermined value, and an operating system 7 as a circuit which provides various functions of the electronic equipment 2. The system DC-DC converter 6 is linked to a voltage input terminal 8 which is an intake of direct-current voltage and acquires an adaptor voltage $V_{IN}$ outputted from a voltage output terminal 5 of the AC adaptor 4, via the voltage input terminal 8. Then, the system DC-DC converter 6 supplies the input voltage to the operating system 7 while adjusting it to be a predetermined value for operating the operating system 7, and activates the operating system 7.

Further, the electronic equipment 2 is provided with a battery 9 (storage battery) in a detachable manner as an independent power supply included in the electronic equipment 2. This battery 9, which includes, for example, a lithium ion battery, takes on a packed shape in which a plurality of electric cells are electrically connected in series and are contained in a single case. The AC adaptor 4 is adapted to be able to supply part of adaptor voltage (electric power) $V_{IN}$ generated by itself to the system DC-DC converter 6 as a system voltage $V_{SYS}$, as well as to supply the rest thereof to the battery 9 as a battery voltage $V_{BATT}$. When the electronic equipment 2 is electrically connected to the external power source 3 via the AC adaptor 4, the power of the AC adaptor 4 is fed to the system DC-DC converter 6 and the operating system 7 is activated by this electric power. Then, at this moment, the battery 9 is charged by the electric power obtained from the AC adaptor 4 while the battery 9 is insulated from the system DC-DC converter 6 by, for example, a reverse biased diode (not shown). On the other hand, when the electronic equipment 2 is not electrically connected to the external power source 3, the electric power of the battery 9 is fed to the system DC-DC converter 6 so that the operating system 7 is activated by this electric power. It is noted that the battery voltage $V_{BATT}$ corresponds to the internal voltage.

The electronic equipment 2 is provided with a charging control circuit (charge IC (Integrated Circuit)) 10 for controlling the charging of the battery 9. Upon connection of the electronic equipment 2 to the external power source 3 by the AC adaptor 4, the charging control circuit 10 supplies the electric power requested by the operating system 7 to the operating system 7 via the system DC-DC converter 6 and concurrently performs the charging to the battery 9. Further, the charging control circuit 10 is made up of, for example, one or more semiconductor devices (semiconductor circuits). Furthermore, the semiconductor device includes, for example, a chip and a package containing the chip. It is noted that the charging control circuit 10 corresponds to the charging circuit.

Further, between a voltage input terminal 8 of the electronic equipment 2 and a node (hereafter, denoted as a system voltage input terminal) Pb which is a wiring-path branching node of the system DC-DC converter 6 and the battery 9, two switches: a first switch SW1 and a second switch SW2, which are electrically connected in series, are electrically connected. Furthermore, between the system voltage input terminal Pb and the battery 9 as well, a third switch SW3 is electrically connected as a similar contact. These switches SW1 to SW3 are electrically connected to a charging control circuit 10 via electric wiring, the on-off operation thereof is managed by the charging control circuit 10. It is noted that the third switch SW3 corresponds to the battery contact, and the system voltage input terminal Pb corresponds to the supply node of the system voltage.

For example, when the AC adaptor 4 is not electrically connected to the electronic equipment 2, although the first switch SW1 among the three switches SW1 to SW3 is turned off, the second switch SW2 and the third switch SW3 are kept on. For that reason, the power of the battery 9 is supplied to the operating system 7 as the system voltage $V_{SYS}$, as well as part of which is supplied to the charging control circuit 10 as a driving voltage $V_{DC}$ allowing the operation of the electronic equipment 2. Then, upon connection of the AC adaptor 4 to the electronic equipment 2, part of the adaptor voltage $V_{IN}$ is supplied to the charging control circuit 10 as a power supply voltage $V_{AC}$, by which the charging control circuit 10 is triggered to turn the first switch SW1 on. As a result, the adaptor voltage $V_{IN}$ is supplied to all of the system DC-DC converter 6, the battery 9, and the charging control circuit 10 thereby making both of the equipment operation and the charging executable.

Further, the electronic equipment 2 is provided with a voltage adjustment function which, upon supply of power from the AC adaptor 4 to the system DC-DC converter 6 and the battery 9, adjusts the supply power to be an appropriate value (safe value) and supplies it where needed. Furthermore, the voltage adjustment function of the present example is also of an adaptor-side control method in which control circuits for controlling the aforementioned function are incorporated in the AC adaptor 4 so that the function control is performed at the AC adaptor 4 side.

In the case of the charging control circuit 10 with this type of voltage adjustment function, a first detection resistor $R_{IN}$ is electrically connected between the second switch SW2 and the system voltage input terminal Pb, and both ends of the first detection resistor $R_{IN}$ are electrically connected to the charging control circuit 10. The first detection resistor $R_{IN}$ detects a total input current $I_{IN}$ flowing into the electronic equipment 2 from the AC adaptor 4, and is made up of, for example, a resistor. The charging control circuit 10 keeps track of the level of the current which flows into the electronic equipment 2 from the AC adaptor 4 by detecting the total input current $I_{IN}$ which flows through the first detection resistor $R_{IN}$.

Further, between the system voltage input terminal Pb and the third switch SW3, a second detection resistor $R_{CHR}$ is electrically connected and the both ends of the second detection resistor $R_{CHR}$ are electrically connected to the charging control circuit 10. The second detection resistor $R_{CHR}$, which detects a battery charging current $I_{CHR}$ which flows into the battery 9 from the total input current $I_{IN}$ which has flown into the electronic equipment 2 from the AC adaptor 4, is made up of, for example, a resistor. The charging control circuit 10 keeps track of the level of the current which flows into the battery 9 by detecting the battery charging current $I_{CHR}$ which flows through the second detection resistor $R_{CHR}$. It is noted that the second detection resistor $R_{CHR}$ corresponds to the detection part.

The charging control circuit 10 is electrically connected with a node Pa (hereafter, denoted as a battery voltage input terminal) Pa which is located on the plus terminal side of the battery 9. The charging control circuit 10 monitors the battery voltage $V_{BATT}$ which is the cross terminal voltage of the battery 9, that is, the charging amount of the battery 9 by measuring the terminal voltage of the battery voltage input terminal Pa. It is noted that the battery voltage input terminal Pa corresponds to the supply node of the battery voltage.

The charging control circuit 10 monitors the voltage supply state of the electronic equipment 2, that is, whether or not an improper voltage is supplied to the electronic equipment 2, based on the total input current $I_{IN}$, the battery charging current $I_{CHR}$, and the battery voltage $V_{BATT}$. Then the charging control circuit 10 outputs a control current $I_{ADFC}$ to the AC adaptor 4, located upstream of the voltage supply path, as its voltage control command so that a suitable adaptor voltage $V_{IN}$ in accordance with the state of the electronic equipment 2 of the times is outputted from the AC adaptor 4. The control current $I_{ADFC}$ is a command for instructing to decrease the adaptor voltage $V_{IN}$ when a voltage higher than a desired level tends to be applied to the electronic equipment 2, and to increase the adaptor voltage $V_{IN}$ when a voltage lower than a desired level tends to be applied to the electronic equipment 2. The electronic equipment 2 is provided with an equipment-side control terminal 11 as an outlet of the control current $I_{ADFC}$, and the equipment-side control terminal 11 is electrically connected to an adaptor-side control terminal 12 of the AC adaptor 4. The charging control circuit 10 supplies the control current $I_{ADFC}$ to the AC adaptor 4 from the equipment-side control terminal 11 via the adaptor-side control terminal 12. It is noted that the control current $I_{ADFC}$ corresponds to the control command.

Figure 2:
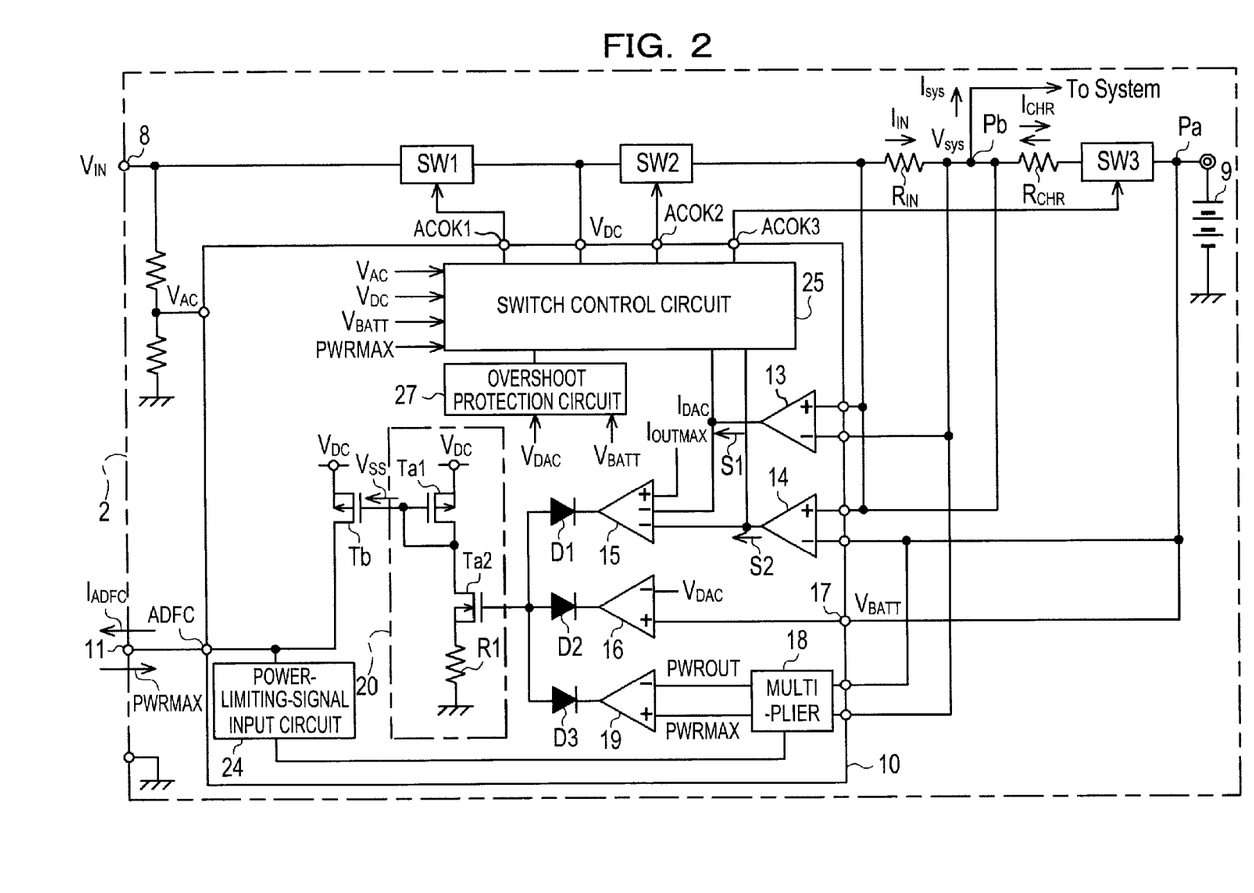
FIG. 2 illustrates a configuration example of the electronic equipment in FIG. 1.

As illustrated in FIG. 2, the charging control circuit 10 is provided with a first current amplifier 13 for a total input current $I_{IN}$ and a second current amplifier 14 for a battery charging current $I_{CHR}$. The first current amplifier 13 has its input terminals electrically connected with the both terminals of the first detection resistor $R_{IN}$. The first current amplifier 13 amplifies the total input current $I_{IN}$ which flows through the first detection resistor $R_{IN}$, and outputs the amplified value as a first current detection signal S1. Further, the second current amplifier 14 has its input terminals electrically connected with both ends of the second detection resistor $R_{CHR}$. The second current amplifier 14 amplifies the battery charging current $I_{CHR}$ which flows through the second detection resistor $R_{CHR}$, and outputs the amplified value as a second current detection signal S2.

The first current amplifier 13 and the second current amplifier 14 are electrically connected with a current error amplifier 15 which is commonly used for the both. The current error amplifier 15 is an amplifier having one non-inverted input terminal and two inverted input terminals. One of the inverted input terminals of the current error amplifier 15 receives as input a first current detection signal S1 outputted by the first current amplifier 13, and the other of the inverted input terminals receives, as input, a second current detection signal S2 outputted by the second current amplifier 14. Further, the non-inverted input terminal of the current error amplifier 15 receives, as input, a reference signal which is generated based on a limiting current signal $I_{DAC}$ and a current reference signal $I_{OUTMAX}$ as a comparison value while monitoring the presence and absence of errors. This limiting current signal $I_{DAC}$, is a program signal to indicate a maximum current which may be safely fed to the battery 9. That is, a threshold value for safe operation permitted by the battery 9, is generated by the charging control circuit 10. Moreover, the current reference signal $I_{OUTMAX}$ is also a threshold value. The current error amplifier 15 compares the reference signal with a larger one between the first current detection signal S1 and the second current detection signal S2, and outputs an error voltage in accordance with the comparison result.

Moreover, the charging control circuit 10 is provided with a voltage error amplifier 16 for monitoring the battery voltage $V_{BATT}$. The voltage error amplifier 16 has its non-inverted input terminal electrically connected to the battery voltage input terminal Pa, and its inverted input terminal electrically connected to the battery voltage input terminal Pa via a charging voltage input terminal 17 of the charging control circuit 10. Therefore, the charging control circuit 10 acquires the battery voltage $V_{BATT}$ through the charging voltage input terminal 17. Further, the inverted input terminal of the voltage error amplifier 16 receives as input a voltage limiting signal $V_{DAC}$ as a comparison value while monitoring the presence and absence of errors. The voltage limiting signal $V_{DAC}$ is a program signal which indicates a maximum voltage which may be safely fed to the battery 9, that is, a threshold value permitted by the battery 9 for safe operation. The voltage error amplifier 16 compares the battery voltage $V_{BATT}$ with the voltage limiting signal $V_{DAC}$ to monitor the voltage value and outputs an error voltage which is an amplification of the difference. It is noted that the voltage error amplifier 16 makes up the voltage monitoring circuit, and the voltage limiting signal $V_{DAC}$ corresponds to the reference voltage.

The charging control circuit 10 is provided with a multiplier 18 for detecting the power amount supplied to the electronic equipment 2. The multiplier 18 has a pair of input terminals electrically connected between the terminals of the first detection resistor $R_{IN}$. This multiplier 18 detects a total input current $I_{IN}$ from the voltage across the terminals of the first detection resistor $R_{IN}$ as well as detects a system voltage $V_{SYS}$ which is supplied to the operating system 7 side through the first detection resistor $R_{IN}$. Then, the multiplier 18 calculates the total power to be applied to the electronic equipment 2 by performing multiplication between the total input current $I_{IN}$ and the system voltage $V_{SYS}$, and outputs the result as a power detection signal PWROUT. Further, the multiplier 18 also synchronously outputs a power limiting signal PWRMAX as a maximum allowable value (threshold value) of the power detection signal PWROUT. It is noted that the multiplier 18 acquires the power limiting signal PWRMAX, which is the threshold value represented by a program signal, from the AC adaptor 4 via an equipment-side control terminal 11.

Further, the multiplier 18 is electrically connected with a power error amplifier 19 for monitoring the power detection signal PWROUT. The inverted input terminal of the power error amplifier 19 receives as input the power detection signal PWROUT, and the non-inverted input terminal receives as input the power limiting signal PWRMAX. The power error amplifier 19 compares the power detection signal PWROUT and the power limiting signal PWRMAX to monitor the power value, and outputs an error voltage which is an amplification of the difference.

The output terminals of three error amplifiers 15, 16, and 19 are electrically connected with separate diodes D1, D2, and D3 respectively. These diodes D1 to D3 are electrically connected in a reverse biased manner and supply to pass an error voltage of a maximum value (error current) out of those outputted from the three error amplifiers 15, 16, and 19 to the down stream. This is equivalent to the arrangement in which the maximum error among the three error amplifiers 15, 16, and 19 is measured while errors are monitored. It is noted that the diode D2 makes up the voltage monitoring circuit.

The anodes of these three diodes D1 to D3 are electrically connected with a current-voltage conversion circuit 20 which converts a current value obtained from the diodes D1 to D3 into a predetermined voltage. The current-voltage conversion circuit 20 is made up of elements of a transistor Ta1, a transistor Ta2, and a resistor R1 electrically connected in series. It is noted that the transistor Ta1 is made up of a P-type MOS (Metal Oxide Semiconductor) transistor and the source terminal thereof is supplied with a driving voltage $V_{DC}$, which is supplied to the charging control circuit 10 out of the adaptor voltage $V_{IN}$ for the purpose of driving. Moreover, the transistor Ta2 is made up of an N-type MOS transistor. The transistor Ta1 operates as a resistor having a resistance value in accordance with the current (error current) which flows through the diodes D1 to D3, and generates a voltage proportional to the error current at a node between the transistor Ta1 and the transistor Ta2. The current-voltage conversion circuit 20 outputs a node voltage between the transistor Ta1 and the transistor Ta2 as a control voltage $V_{SS}$ which may be necessary to generate a control current $I_{ADFC}$. It is noted that the current-voltage conversion circuit 20 corresponds to the command output circuit.

The output terminal of the current-voltage conversion circuit 20, that is, a node between the transistor Ta1 and the transistor Ta2 is electrically connected with a transistor Tb as a generation source of the control current $I_{ADFC}$. The transistor Tb is made up of, for example, a P-type MOS transistor, with its source terminal being electrically connected to the driving voltage $V_{DC}$, its drain terminal to the equipment-side control terminal 11, and its gate terminal to the node between the transistor Ta1 and the transistor Ta2. The transistor Tb supplies as a resistor having a resistance value in accordance with the control voltage $V_{SS}$ which is inputted to its own gate terminal, that is, the node voltage between the transistor Ta1 and the transistor Ta2 and generates a control current $I_{ADFC}$ at a value in accordance with the resistance value.

In the present example, since the transistor Tb is of a P-type MOS transistor, it has an operational characteristic that it exhibits a high resistance value when the gate voltage is high, and on the other hand, exhibits a low resistance value when the gate voltage is low. As a result, the transistor Tb operates to generate a control current $I_{ADFC}$ of a lower value as the error increases in the detection result at the control voltage $V_{SS}$ from the current-voltage conversion circuit 20, that is, the detection result at the error amplifiers 15, 16, and 19 in the front thereof and, on one hand, to generate a control current $I_{ADFC}$ of a higher value as the error decreases. Then, the control current $I_{ADFC}$ is drawn out from a command input/output terminal ADFC of the charging control circuit 10 to the outside of the charging control circuit 10 and is outputted to the AC adaptor 4 via the control terminals 11 and 12.

Figure 3A:
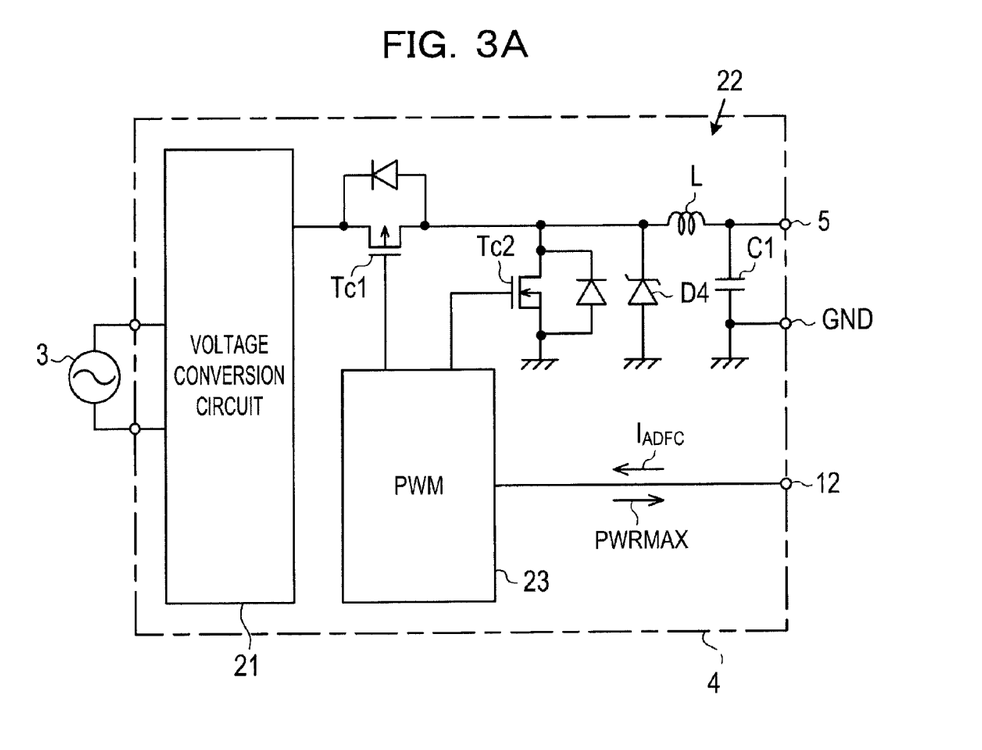
FIG. 3A illustrates the AC adaptor in FIG. 1.

As illustrated in FIGS. 1 and 3A, the AC adaptor 4 is provided with a voltage conversion circuit 21 for converting the alternating voltage obtained from the external power source 3 into a predetermined direct-current voltage, and a voltage control circuit 22 for controlling the voltage after the direct-current conversion to be a voltage value in accordance with a requirement from the electronic equipment 2. Between the voltage conversion circuit 21 and the voltage output terminal 5, a transistor Tc1 and a choke coil L are electrically connected in series. The transistor Tc1 is made up of a P-type MOS transistor. Moreover, between the intermediate terminal between the transistor Tc1 and the choke coil L, and a GND, a transistor Tc2 and a diode D4 are electrically connected in a parallel state. Moreover, between the intermediate terminal between the voltage output terminal 5 and the choke coil L, and a GND, a capacitor C1 for the purpose of smoothing is electrically connected. The transistor Tc2 is made up of an N-type MOS transistor.

Figure 3B:
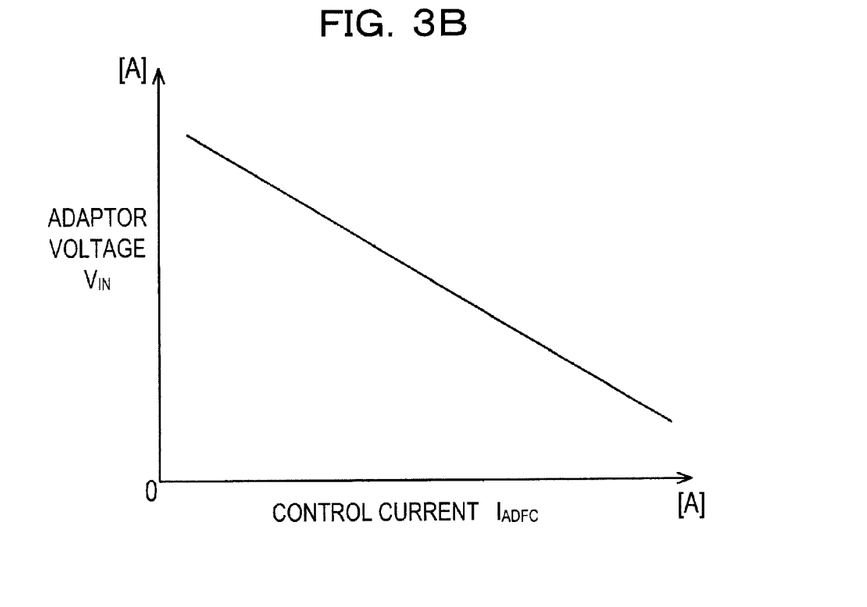
FIG. 3B illustrates the relation between an adaptor voltage and a control current.

Moreover, the transistors Tc1 and Tc2 are electrically connected with a pulse width modulator (PWM circuit) 23 for controlling the switching of the transistors Tc1 and Tc2. The pulse width modulator 23 performs on-off control of the transistor Tc1 and the transistor Tc2 in a complementary manner at a predetermined duty cycle. When the transistor Tc1 is ON, the output voltage of the voltage conversion circuit 21 is smoothed by an LC circuit (smoothing circuit) made up of the choke coil L and the capacitor C1, and is supplied to the voltage output terminal 5. Then, when the transistor Tc1 is switched to OFF, the energy accumulated in the choke coil L during ON time is discharged to voltage output terminal 5 side and, through the repetition of the on-off operation, an adaptor voltage $V_{IN}$ is generated. As illustrated in FIG. 3B, the adaptor voltage $V_{IN}$ is outputted at a high value upon receipt of a low control current $I_{ADFC}$, and is outputted at a low value upon receipt of a high control current $I_{ADFC}$.

The pulse width modulator 23 receives as input a control current $I_{ADFC}$ which is provided from the electronic equipment 2 to the AC adaptor 4 via the adaptor-side control terminal 12. The pulse width modulator 23 monitors the current value of the control current $I_{ADFC}$ received from the electronic equipment 2 and, based on the current value, controls the value of the adaptor voltage $V_{IN}$ by changing the duty cycle, that is, by switching the ON period of the transistor Tc1. In such a case, when the ON period of the transistor Tc1 is long, the energy accumulated in the choke coil L increases and a higher adaptor voltage $V_{IN}$ is outputted, and when the ON period of the transistor Tc1 is short, the energy accumulated in the choke coil L decreases and a lower adaptor voltage $V_{IN}$ is outputted.

The pulse width modulator 23 successively recognizes what value of the adaptor voltage $V_{IN}$, that is, what level of power is supplied to the electronic equipment 2 and, while generating a power limiting signal PWRMAX as power information, outputs the power limiting signal PWRMAX from the adaptor-side control terminal 12 to the electronic equipment 2 upon receipt of the control current $I_{ADFC}$. The power limiting signal PWRMAX is made up of a voltage signal which increases/decreases in accordance with the value of the adaptor voltage $V_{IN}$, and is used as needed in the computation at the multiplier 18 and in other various functions. While receiving a control current $I_{ADFC}$ from the electronic equipment 2, the pulse width modulator 23, in a manner to respond that, feeds back the power limiting signal PWRMAX to the electronic equipment 2.

On the other hand, as illustrated in FIG. 2, there is provided between the equipment-side control terminal 11 and the multiplier 18 in the electronic equipment 2, a power-limiting-signal input circuit 24, which recognizes the value (voltage) of the power limiting signal PWRMAX and feeds it to the multiplier 18. The power-limiting-signal input circuit 24 takes in a power limiting signal PWRMAX by observing the voltage value among various signals flowing on the connections of the equipment-side control terminal 11, and outputs the power limiting signal PWRMAX received from the AC adaptor 4 to the multiplier 18 by outputting a notification in accordance with the signal value to the multiplier 18. That is, while the control current $I_{ADFC}$ is taken in as a current value, the power limiting signal PWRMAX is interpreted as a voltage value so as to enable the transfer of the control current $I_{ADFC}$ from the electronic equipment 2 to the AC adaptor 4 and the transfer of the power limiting signal PWRMAX from the AC adaptor 4 to the electronic equipment 2 on a single wiring.

As illustrated in FIG. 2, the charging control circuit 10 is provided with a switch control circuit 25 for managing the switch states of a first switch SW1 to a third switch SW3. The switch control circuit 25 receives as input, for example, a power supply voltage $V_{AC}$, a driving voltage $V_{DC}$, a first current detection signal S1, a second current detection signal S2, a battery voltage $V_{BATT}$, a power limiting signal PWRMAX, and the like. Moreover, the switch control circuit 25 is electrically connected to the first switch SW1 via a first switch-signal output terminal ACOK1 of the charging control circuit 10, to the second switch SW2 via a second switch-signal output terminal ACOK2 of the charging control circuit 10, and to the third switch SW3 via a third switch-signal output terminal ACOK3 of the charging control circuit 10.

Figure 4:
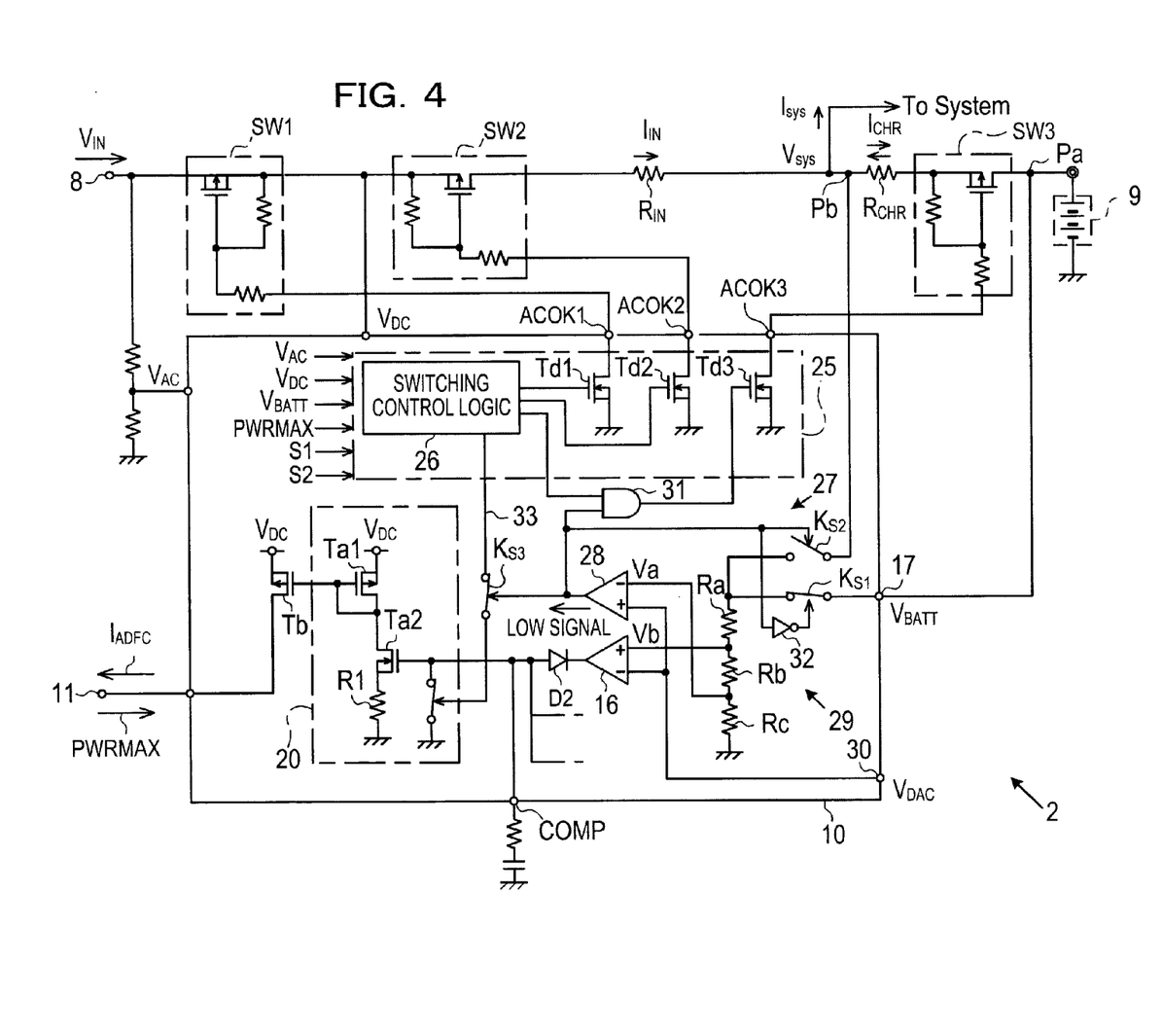
FIG. 4 illustrates an example of the charging control circuit in FIG. 1.
Figure 5:
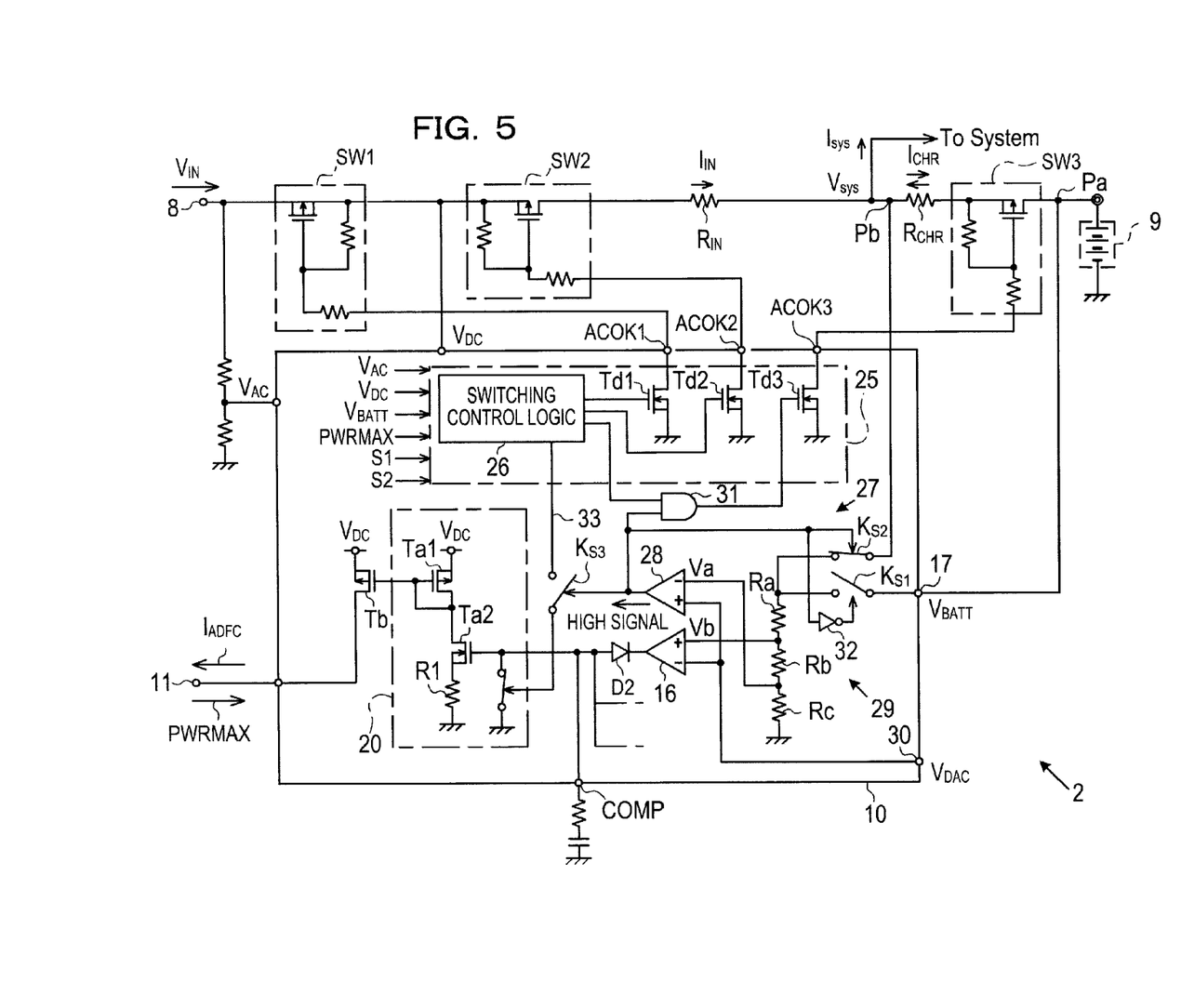
FIG. 5 illustrates an operating state of the charging control circuit in FIG. 4 upon occurrence of an overvoltage.

Moreover, as illustrated in FIGS. 4 and 5, the switch control circuit 25 is provided with switching control logic 26 as the logic which actually takes charge of the switching control of the switches SW1 to SW3. The switching control logic 26 is electrically connected with a transistor Td1 linked to the first switch-signal output terminal ACOK1, a transistor Td2 linked to the second switch-signal output terminal ACOK2, and a transistor Td3 linked to the third switch-signal output terminal ACOK3. The transistors Td1 to Td3 are made up of, for example, N-type MOS transistors and the gate terminal of each is controlled by the switching control logic 26.

Further, in the present example, the switches SW1 to SW3 are made up of P-type MOS transistors and several resistors. The switches SW1 to SW3 are configured such that the gate terminal of the transistor of the first switch SW1 is electrically connected to the first switch-signal output terminal ACOK1, the gate terminal of the transistor of the second switch SW2 is electrically connected to the second switch-signal output terminal ACOK2, and the gate terminal of the transistor of the third switch SW3 is electrically connected to the third switch-signal output terminal ACOK3. The switches SW1 to SW3 turn to ON upon receipt of a Low signal from the charging control circuit 10, while turn to OFF upon receipt of a High signal. It is noted that the switching control logic 26 makes up the protection part and the control circuit.

The switching control logic 26 turns on/off the switches SW1 to SW3 by switching between High and Low of the signal level outputted from the switch-signal output terminals ACOK1 to ACOK3 by controlling the gate terminal of each of the transistors Td1 to Td3 using the first current detection signal S1, the second current detection signal S2, the battery voltage $V_{BATT}$, and further the above described power supply voltage $V_{AC}$ and the driving voltage $V_{DC}$, etc. For example, upon confirming the input of the power supply voltage $V_{AC}$, the switching control logic 26 turns all of the three switches SW1 to SW3 to on-state thereby performing both the system operation and charging. Moreover, upon confirming the battery 9 being fully charged from the value of the battery voltage $V_{BATT}$ while the system is activated, the switching control logic 26 turns off the third switch SW3 out of the three switches SW1 to SW3 which are in on-state, and ends the charging of the battery 9.

Figure 6:
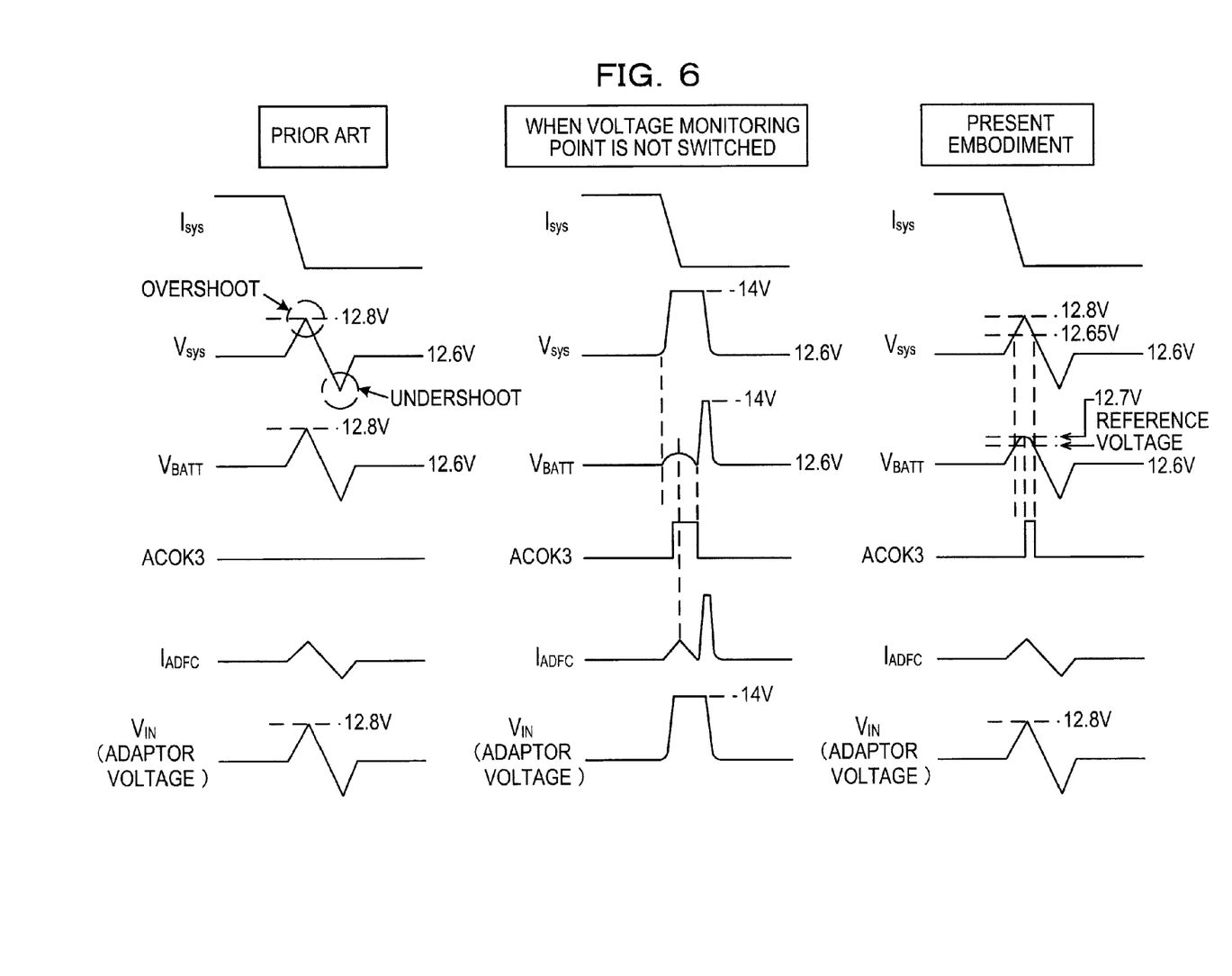
FIG. 6 is a timing chart to illustrate the operation of the electronic equipment in FIG. 1 upon occurrence of an overvoltage.

Further, the charging control circuit 10 is provided with a battery protection function which prevents an overvoltage from being applied to the battery 9 even in the event of a sudden change of the system load such as due to a sudden decrease of the system current $I_{SYS}$ flowing into the system DC-DC converter 6 thereby protecting the battery 9. By the way, in the case of a conventional circuit in which this kind of battery protection function is not provided, when there is a sudden change in the system load, the system voltage $V_{SYS}$ will significantly fluctuate for a short time as illustrated in FIG. 6 because of the fact that even if the control loop of the charging control circuit 10 side has a high responsiveness, the response speed of the AC adaptor 4 side is still too low to track the sudden change. As the result of that, a problem arises in that overshooting and undershooting take places in the battery voltage $V_{BATT}$ causing a degradation of the battery 9.

Then, as illustrated in FIGS. 4 and 5, the charging control circuit 10 of the present example is provided with an overshoot protection circuit 27 for protecting the battery 9 from overshooting in the event of a sudden change of system load. The overshoot protection circuit 27 is provided with an OVP (Over Voltage Protection circuit) 28 for detecting an overshoot of the battery voltage $V_{BATT}$. An inverted input terminal of the OVP 28 is electrically connected to a voltage dividing resistor 29 linked to a charging voltage input terminal 17. In the present example, the voltage dividing resistor 29 is made up of three resistors Ra to Rc, and its intermediate terminal, which is located between the second and third resistors Rb and Rc aligned in that order from the charging voltage input terminal 17 side, is electrically connected to an inverted input terminal of the OVP 28. As a result, the inverted input terminal of the OVP 28 receives as input a divided voltage Va between the resistors Rb and Rc. Moreover, the non-inverted input terminal of the OVP 28 is electrically connected to a voltage-limiting-signal input terminal 30 which is an input terminal of the voltage limiting signal $V_{DAC}$ in the charging control circuit 10, and receives as input the voltage limiting signal $V_{DAC}$ which is taken in at the voltage-limiting-signal input terminal 30. The OVP 28 compares the divided voltage Va of the voltage dividing resistor 29 with the voltage limiting signal $V_{DAC}$ to monitor whether or not a sudden change of the system load, that is, an overvoltage has occurred. Then, when the divided voltage Va is lower than the voltage limiting signal $V_{DAC}$, the OVP 28 recognizes that a sudden change of system has not occurred, and outputs a Low signal, and when the divided voltage Va is not lower than the voltage limiting signal $V_{DAC}$, the OVP 28 recognizes that a sudden change of system has occurred, and outputs a High signal. It is noted that the OVP 28 corresponds to the monitoring part, and the High signal outputted from the OVP 28 corresponds to the overvoltage signal.

It is noted that the non-inverted input terminal of the voltage error amplifier 16 is electrically connected to an intermediate terminal between the first and the second resistors Ra and RB aligned in that order from the charging voltage input terminal 17 side, and receives as input a divided voltage Vb (>Va) generated at the intermediate terminal. Moreover, the inverted input terminal of the voltage error amplifier 16 is electrically connected to the voltage-limiting-signal input terminal 30, and receives as input a voltage limiting signal $V_{DAC}$ from the voltage-limiting-signal input terminal 30. The voltage error amplifier 16 compares the divided voltage Vb obtained from the voltage dividing resistor 29 and the voltage limiting signal $V_{DAC}$ obtained from the voltage-limiting-signal input terminal 30 to calculate the above described error voltage.

Moreover, the output terminal of the OVP 28 is electrically connected to the transistor Td3 via an AND circuit 31. The AND circuit 31 has one of its input terminals electrically connected to the output terminal of the OVP 28, the other of its input terminals electrically connected to a switching control logic 26, and its output terminal electrically connected to the gate terminal of the transistor Td3. Having received an operation command (that is, a High signal) from the switching control logic 26, and further receiving a notification of the presence of an overshoot (that is, a High signal) from the OVP 28, the AND circuit 31 outputs a High signal from the output terminal to turn on the transistor Td3 and thereby acts to turn off the third switch SW3 and to forcibly disconnect the battery 9 from the adaptor voltage $V_{IN}$. It is noted that the AND circuit 31 may be part of the protection part.

Further, the charging control circuit 10 is provided with a switch $K_{s1}$ as a switching element for switching a voltage monitoring node of the OVP 28, on the path linking the battery voltage input terminal Pa and a voltage dividing resistor 29. The switch $K_{s1}$, which is made up of, for example, elements such as transistors etc., has its control terminal (not shown), which is an input node of a command when switching its own switch state, electrically connected to the output terminal of the OVP 28 via a NOT circuit 32. The switch $K_{s1}$, of which switch state is controlled by an output signal from the OVP 28, is in an on-state when a voltage is applied to the control terminal, and is in an off-state when no voltage is applied to the control terminal. It is noted that the switch $K_{s1}$ makes up the switch and the battery-side switching contact.

Moreover, the charging control circuit 10 is also provided with a switch $K_{s2}$ as a switching element which provides a function similar to that of the switch $K_{s1}$ on the path linking the system voltage input terminal Pb and the voltage dividing resistor 29. The switch $K_{s2}$, which is also made up of elements such as transistors, has its control terminal (not shown), which is an input node of the command when switching the switch state of its own, directly electrically connected to the output terminal of the OVP 28. The switch $K_{s2}$, of which switch state is also controlled by the output signal from the OVP 28, is in an on-state when a voltage is applied to the control terminal, and is in an off-state when no voltage is applied to the control terminal. It is noted that the switch $K_{s2}$ makes up the switch and the battery-side switching contact.

Here, for example, when the divided voltage Va, which is inputted to an inverted input terminal of the OVP 28, is lower than the voltage limiting signal $V_{DAC}$ and a Low signal is outputted from the OVP 28, the Low signal is supplied to the switch $K_{s1}$ as a High signal by being inverted at the NOT circuit 32, and is supplied to the switch $K_{s2}$ as a Low signal. As a result, the switch $K_{s1}$ is in an on-state and the switch $K_{s2}$ is in an off-state so that the inverted input terminal of the OVP 28 is linked with the battery voltage input terminal Pa and the voltage monitoring node of the OVP 28 will be the battery voltage input terminal Pa. On the other hand, when the divided voltage Va becomes not less than the voltage limiting signal $V_{DAC}$ and a High signal is outputted from the OVP 28, although the High signal will be supplied to the switch $K_{s1}$ as a Low signal by being inverted at the NOT circuit 32, it is supplied to the switch $K_{s2}$ as a High signal. Thus, as the result of the switch $K_{s1}$ taking off-state and the switch $K_{s2}$ taking on-state, the inverted input terminal of the OVP 28 is linked to the system voltage input terminal Pb this time, and the voltage monitoring node of the OVP 28 is switched to the system voltage input terminal Pb from the battery voltage input terminal Pa which is the then monitoring node.

Moreover, the switching control logic 26, which is electrically linked to a current-voltage conversion circuit 20 via a control line 33, controls the current-voltage conversion circuit 20 in accordance with the switch control of the switches SW1 to SW3. For example, the switching control logic 26 feeds a command, which causes the control current $I_{ADFC}$ to decrease to "0", to the current-voltage conversion circuit 20 to make an adaptor voltage $V_{IN}$ not to be outputted from the AC adaptor 4 when High signals are outputted from all the three switch signal output terminals ACOK1 to ACOK3 to turn off all of the three switches SW1 to SW3 so that the control current $I_{ADFC}$ is not supplied from the electronic equipment 2 to the AC adaptor 4.

Further, the charging control circuit 10 is electrically connected with a switch $K_{s3}$ made up of elements such as, for example, P-type MOS transistors, on the control line 33. The switch $K_{s3}$ has its control terminal (not shown), which is an input node of a command when switching its own switch state, electrically connected to the output terminal of the OVP 28, and on-off switching thereof is controlled by an output signal from the OVP 28. Under the condition that a High signal is outputted from the OVP 28 and a High signal is outputted from the third switch-signal output terminal ACOK3, when High signals are outputted from all the switch signal output terminals ACOK1 to ACOK3, the switch $K_{s3}$ acts to break the connection between the current-voltage conversion circuit 20 and the switching control logic 26 so that the command to decrease the control current $I_{ADFC}$ to "0" is prevented from being fed from the switching control logic 26 to the current-voltage conversion circuit 20. It is noted that the switch $K_{s3}$ corresponds to the breaking part.

Next, the power supply operation to the electronic equipment 2 by the AC adaptor 4 of the present example will be described with reference to the timing chart of FIG. 6.

For example, in a normal state in which no sudden voltage change such as an overshoot etc. takes place in the system voltage $V_{SYS}$ and the system load is stable, the switch $K_{s1}$ is in an on-state and the switch $K_{s2}$ is in an off-state. Since, as a result, the inverted input terminal of the OVP 28 takes a electrically connected state with the battery voltage input terminal Pa, the voltage monitoring node of the voltage error amplifier 16 will be the battery voltage input terminal Pa. Therefore, the voltage error amplifier 16 monitors errors relating to the supply voltage to the electronic equipment 2 by monitoring the voltage acquired from the battery voltage input terminal Pa, that is, the battery voltage $V_{BATT}$.

Here, suppose a case in which the system load has suddenly changed As a result, for example, the system current $I_{SYS}$ flowing into the operating system 7 out of the total input current $I_{IN}$ significantly decreases. At this moment, if for example, an overshoot takes place in the system voltage $V_{SYS}$ in association with the aforementioned current change and its value fluctuates from the voltage at that time (for example, 12.6 V) to a high voltage (for example, 12.8 V), then, in association with this voltage change, the divided voltage Va of the inverted input terminal of the OVP 28 exhibits a voltage increase to a value not less than the voltage limiting signal $V_{DAC}$. As a result, a High signal is outputted from the OVP28 instead of a Low signal.

Since, when the electronic equipment 2 is in an activated state, a High signal is supplied from the switching control logic 26 to the AND circuit 31, when a High signal is outputted from the output terminal of the OVP 28, both of the two inputs of the AND circuit 31 will take the High level, and a High signal instead of a Low signal at that time will be outputted from the output terminal of the AND circuit 31. Therefore, the High signal is applied to the transistor Td3 to turn on the transistor Td3, and in association with the on-operation, the third switch SW3 turns to OFF. As a result, the battery 9 is electrically disconnected from the system voltage $V_{SYS}$, so that even if the system voltage $V_{SYS}$ exhibits an overshoot, it will be prevented from being applied to the battery 9 thus protecting the battery 9 from overvoltage.

Moreover, when a High signal is outputted from the OVP 28, the High signal is outputted to both the switch $K_{s1}$ and the switch $K_{s2}$. In that instance, since the High signal is supplied to the switch $K_{s1}$ with the signal level being inverted at the NOT circuit 32, and is supplied to the switch $K_{s2}$ with the signal level without change, at this time, the switch $K_{s1}$ turns from ON to OFF and the switch $K_{s2}$ turns from OFF to ON. Thus, since the inverted input terminal of the OVP 28 is newly linked to the system voltage input terminal Pb instead of the battery voltage input terminal Pa, the voltage monitoring node of the voltage error amplifier 16 will be the system voltage input terminal Pb. As a result, the voltage error amplifier 16 continues to perform voltage monitoring by monitoring the voltage of the system voltage $V_{SYS}$ after the third switch SW3 is turned off, and causes the control current $I_{ADFC}$ to be outputted from the equipment-side control terminal 11 to be outputted at an appropriate value in accordance with the current to be applied to the electronic equipment 2.

Another case, in which the switching of the voltage monitoring node as with the present example is not performed when the third switch SW3 is turned off, since the voltage error amplifier 16 at that time is supplied with a battery voltage $V_{BATT}$ of which voltage gradually decreases as the result of the third switch SW3 being turned off, is illustrated in FIG. 6. Here, the voltage error amplifier 16 will detect an error at a value which is on an increasing trend. Thus, since the voltage error amplifier 16 outputs a lower voltage, thus reducing the gate voltage of the transistor Ta2, and the current-voltage conversion circuit 20 outputs the control current $I_{ADFC}$ at a smaller value, the AC adaptor 4 will have outputted the adaptor voltage $V_{IN}$ at a higher value (for example, 14V). As a result, when the divided voltage Va becomes less than the voltage limiting signal $V_{DAC}$ with the switch $K_{s1}$ returning to ON and the switch $K_{s2}$ returning to OFF, that is, when the voltage monitoring node returns from the system voltage input terminal Pb to the battery voltage input terminal Pa, an overvoltage (that is, 14V) will be applied to the battery 9, and this will flow to the battery 9 as a inrush current causing a degradation of the battery 9.

However, in the present example, when the third switch SW3 is turned off to disconnect the battery 9 from the system voltage $V_{SYS}$, the voltage monitoring node is switched to the system voltage input terminal Pb in place of the battery voltage input terminal Pa which is the voltage monitoring node. Therefore, since the voltage monitoring is continued to be performed by monitoring the system voltage $V_{SYS}$, it may become possible to inhibit a large change in the control current $I_{ADFC}$. Thus, even while the third switch SW3 is in off-state, an appropriate adaptor voltage $V_{IN}$ is supplied from the AC adaptor 4 to the electronic equipment 2. As a result, when the voltage monitoring node is returned from the system voltage input terminal Pb to the battery voltage input terminal Pa, an inrush current is less likely to flow to the battery 9 making it possible to protect the battery 9 in this viewpoint as well, for example.

Moreover, when a High signal is outputted from the OVP 28, the High signal is supplied to the switch $K_{s3}$ as well, and the High signal causes the switch $K_{s3}$ to be switched to an off-state from the on-state at that time. As a result, the switching control logic 26 is electrically disconnected from the current-voltage conversion circuit 20 so that the control of the current-voltage conversion circuit 20 is masked. As a result, when the voltage monitoring node is the system voltage input terminal Pb, even if the switching control logic 26 performs control to issue a High signal from all of the switch-signal output terminals ACOK1 to ACOK3, at this time, it may be possible to prevent the current-voltage conversion circuit 20 from performing the control to make the control current $I_{ADFC}$ to be "0". Therefore, the control current $I_{ADFC}$ will not be decreased to "0", and the adaptor voltage $V_{IN}$ is kept at an appropriate value.

It is noted that the above described embodiment may be applied to a charging circuit, a charging apparatus, electronic equipment and a charging method for supplying a direct-current voltage taken in from an adaptor to the operating system within the electronic equipment and concurrently feeding the voltage to the battery of the electronic equipment as well to charge the battery.

The above described first embodiment, in summary, comprises: a monitoring part which monitors a battery voltage which is a parameter when generating the above described control command; a protection part which, when receiving an overvoltage signal which indicates that the battery is under an overvoltage condition from the monitoring part, electrically disconnects the battery from the adapter to protect the battery from overvoltage by turning off a battery contact which determines whether or not the charging to the battery is to be performed; and a switch which, when the battery contact is electrically disconnected from the adaptor, switches the monitoring node of the internal voltage from the supply node of the battery voltage to the supply node of the system voltage based on the overvoltage signal outputted from the monitoring part to cause the control command to be generated at a value based on the system voltage.

According to the above described first embodiment, when the adaptor voltage is supplied from the adaptor to the electronic equipment, part of the voltage is supplied as a system voltage to the operating system for its operation, and the rest of the voltage is supplied to the battery to accumulate the power of the battery. At this time, for example, as the internal voltage within the electronic equipment, a battery voltage is monitored, and control to feed a control command in accordance with the battery power to the adaptor side to adjust the adaptor voltage, that is, a feedback control is performed, and the adaptor voltage is outputted at an appropriate value in accordance with the value of the control command. For example, when the adaptor voltage to be applied to the electronic equipment is insufficient, the adaptor voltage is outputted at larger values, and when the adaptor voltage has a sufficient value, the adaptor voltage is outputted at smaller values.

Moreover, when supplying adaptor voltage to the electronic equipment, the battery voltage, which is a parameter when generating a control command, is monitored by the monitoring part. By the way, for example, when the system load suddenly changes due to such as a sudden decrease of system current which flows into the operating system, the battery voltage may fluctuate and an overshoot (undershoot), for example, may take place in the battery voltage. In the case of the present example, the voltage change will be detected by the monitoring part, and an overvoltage signal will be outputted from the monitoring part to a protection part. Then, the protection part is activated by the overvoltage signal to act to turn off the battery contact, thereby disconnecting the battery from the adaptor. As a result, since the battery is not applied with overvoltage, it may become possible to protect the battery from overvoltage, thus preventing a battery degradation caused by overvoltage application.

Further, when the battery contact is turned off, the voltage monitoring node, which is making observation to generate a control command, is switched to the supply node of the system voltage from the supply node of the battery voltage which is the voltage monitoring node theretofore. Since this enables holding the control command at a value before the contact is turned off, it may become possible to suppress the change of the control command to be small. Thus, since the adaptor voltage is prevented from fluctuating upwardly, an overvoltage state of the battery voltage is settled so that a large inrush current is prevented from flowing to the battery when the battery contact returns to ON. Thus, if the inrush current is suppressed to be low, it may become possible to prevent a battery degradation caused by the inflow of the inrush current when the battery contact returns to ON.

The advantages according to the first embodiment described above will be summarized below.

In the event that the system load suddenly changes and an overvoltage is applied to the battery 9, this voltage change is detected at the OVP 28 and the third switch SW3 is turned off to disconnect the battery 9 from the AC adaptor 4. Since this will enable to prevent an overvoltage from being applied to the battery 9, it may be possible to suppress the battery degradation caused by overvoltage application. Further, when the third switch SW3 is turned off at the occurrence of overvoltage, the switch $K_{s1}$ which has been in on-state till that time is turned off, while the switch $K_{s2}$ which has been in off-state till that time is turned on, and the voltage monitoring node, which needs to be observed when determining the value of the control current $I_{ADFC}$, is switched to the system voltage input terminal Pb from the battery voltage input terminal Pa which is the voltage monitoring node theretofore. Since this will result in that the control current $I_{ADFC}$ takes a value which will not follow the battery voltage $V_{BATT}$ of which value keeps on decreasing, but will follow the system voltage $V_{SYS}$ which is under a controlled circumstance, the control current $I_{ADFC}$ will not change significantly. As a result, since a situation in which the system voltage $V_{SYS}$ fluctuates toward a high voltage (for example, 14V) in accordance with the variation of the control current $I_{ADFC}$ will not take place, it may be possible to prevent the battery voltage $V_{BATT}$ from being a high voltage when overvoltage is settled and the third switch SW3 returns to ON again. Thus, since an inrush current is prevented from flowing to the battery 9, it may be also possible to prevent a battery degradation caused by the inflow of an inrush current.

When an overvoltage takes place in the power supply path in the electronic equipment 2 and the voltage monitoring node is switched to the system voltage input terminal Pb from the battery voltage input terminal Pa, the switch $K_{s3}$ linking the switching control logic 26 and the current-voltage conversion circuit 20 is turned off to disconnect the current-voltage conversion circuit 20 from the switching control logic 26. Since, as a result, the control of the current-voltage conversion circuit 20 by the switching control logic 26 is masked, it may be possible to hold the control current $I_{ADFC}$ at an appropriate value.

An adjustment function to increase/decrease the adaptor voltage $V_{IN}$ based on the control current $I_{ADFC}$ outputted from the charging control circuit 10, that is, a feedback control function of the adaptor voltage $V_{IN}$ is incorporated in the adaptor 4. Since, as a result, such a voltage adjustment function need not be incorporated in the electronic equipment 2, it may be possible to simplify the configuration of the electronic equipment 2 for that part.

Since the component for switching the voltage monitoring node is made up of two switches: the switch $K_{s1}$ linked to the battery voltage input terminal Pa and the switch $K_{s2}$ liked to the system voltage input terminal Pb, it may be possible to accomplish the component for switching the voltage monitoring node with a simple configuration of two switches.

When determining the presence or absence of overvoltage, the OVP 28 acquires the voltage limiting signal $V_{DAC}$, which is needed as the reference voltage in the determination, from outside the charging control circuit 10. Since, as a result, there is no need of incorporating the circuit needed for generating such kind of reference voltage, in the charging control circuit 10, it may be possible to simplify the configuration of the charging control circuit 10 for that part.

The charging control circuit 10 of the present example generates error voltages for four detection targets by three error amplifiers 15, 16, and 19. By the way, although it is general that an error amplifier is typically provided in correspondence to respective detection targets, since the present example generates an error voltage for the total input current $I_{IN}$ flowing to the first detection resistor $R_{IN}$, and an error voltage for the battery charging current $I_{CHR}$ flowing into the battery 9 with one error amplifier 15, it may be possible to reduce the number of external parts for a chip. Since, as a result, the number of pins of the connection pins (connection terminals) of the charging control circuit 10 may be made small, it may be possible to reduce the size of the chip and the package in which the chip is sealed.

It is noted that the first embodiment may be practiced in the following mode which is a convenient modification of the first embodiment.

Figure 7:
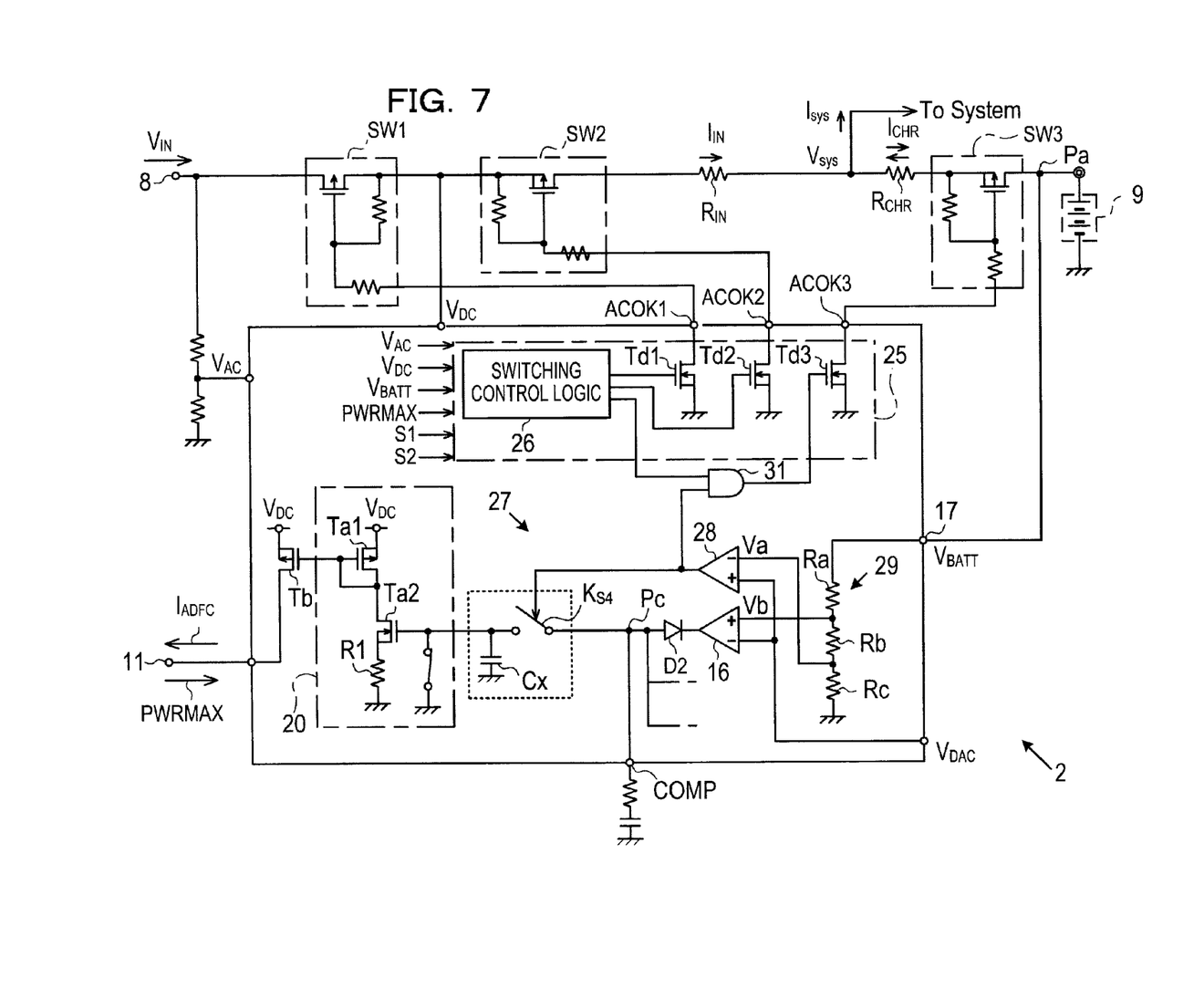
FIG. 7 illustrates electronic equipment to which a second embodiment is applied.

It is not limited that the monitoring part be made up of parts including the switch $K_{s1}$ linked to the battery voltage input terminal Pa and the switch $K_{s2}$ linked to the system voltage input terminal Pb. For example, as illustrated in FIG. 7, it may be parts made up of a switch $K_{s4}$ electrically connected between the voltage error amplifier 16 and the current-voltage conversion circuit 20, and a capacitor Cx electrically connected between a node between the current-voltage conversion circuit 20 and the switch $K_{s4}$, and the GND. In such a case, when the OVP 28 detects an overvoltage, the response of potential of the connection terminal Pc controlling the value of the control current $I_{ADFC}$ is delayed so that the control current $I_{ADFC}$ is masked while the OVP 28 is detecting overvoltage. In that case, it may be possible to accomplish the monitoring part with a simple configuration of the switch $K_{s4}$ and the capacitor Cx. It is noted that the switch $K_{s4}$ makes up the switch and the connection contact, and the capacitor Cx makes up the switch.

Figure 8:
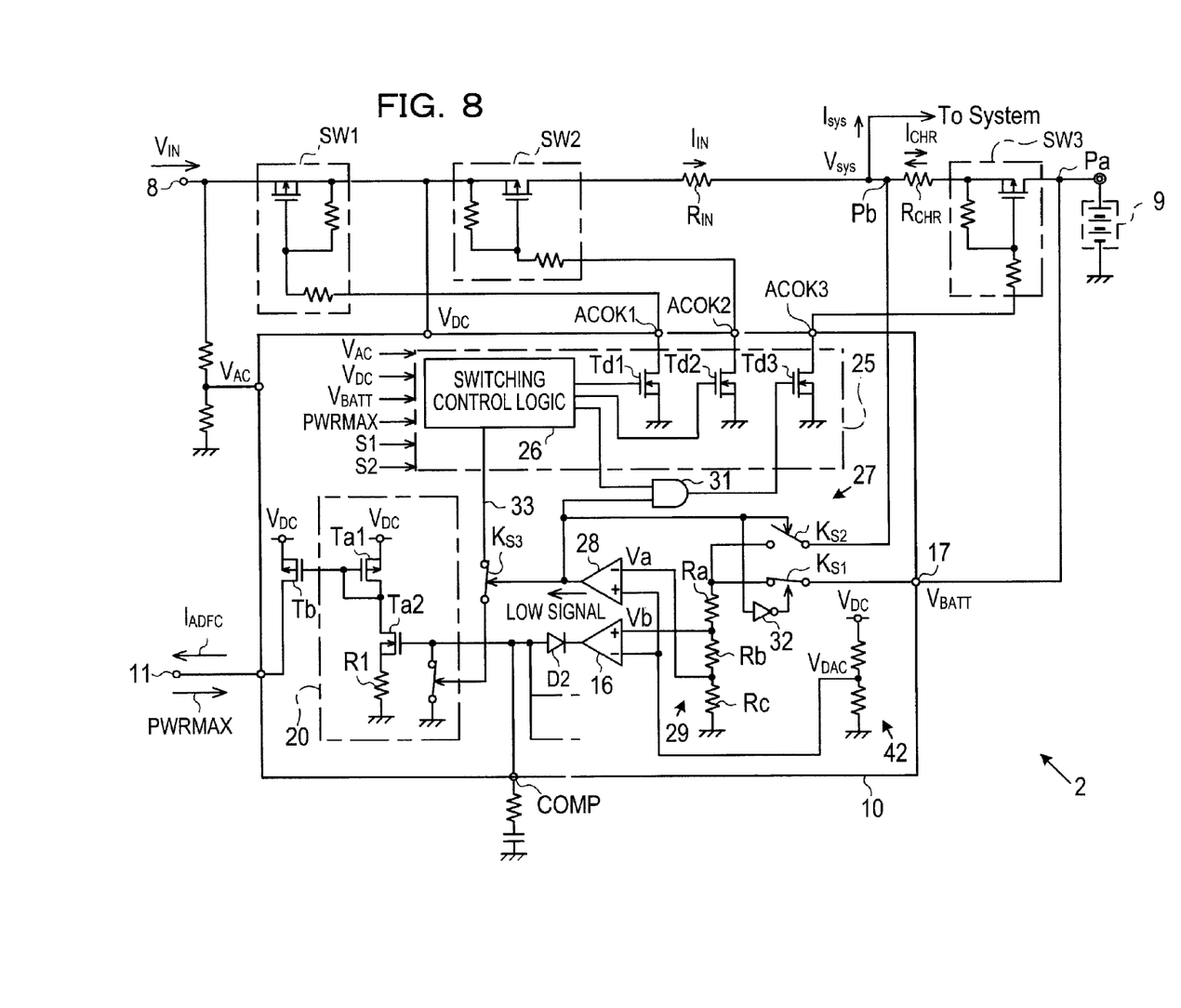
FIG. 8 illustrates electronic equipment to which a third embodiment is applied.

The voltage limiting signal $V_{DAC}$ need not, necessarily, be supplied to the charging control circuit 10 from outside the charging control circuit 10. For example, as illustrated in FIG. 8, the arrangement may be such that a voltage dividing resistor 42 is incorporated inside the charging control circuit 10 and the voltage limiting signal $V_{DAC}$ is generated by the voltage dividing resistor 42 inside the charging control circuit 10.

Figure 9:
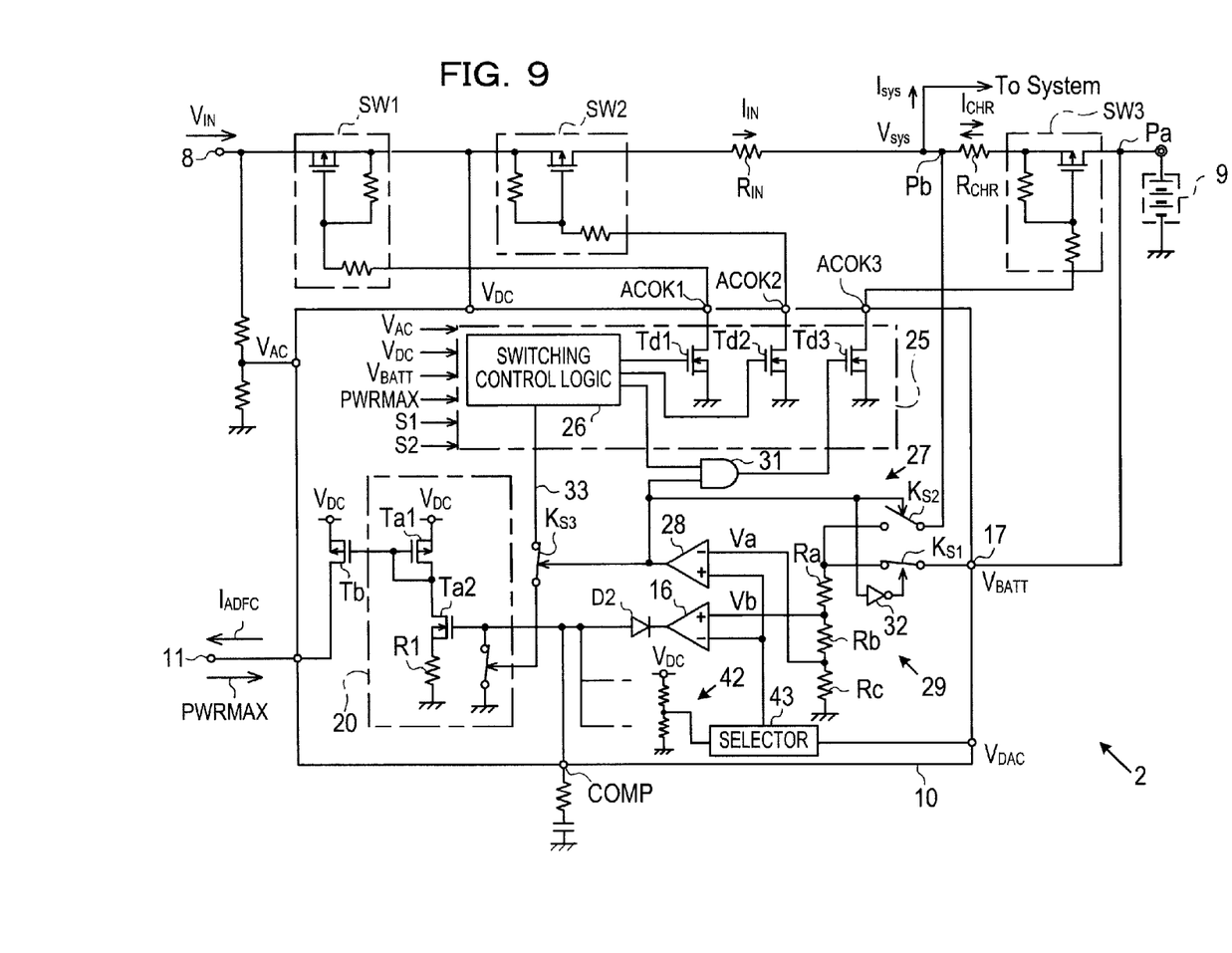
FIG. 9 illustrates electronic equipment to which a fourth embodiment is applied.

The voltage limiting signal $V_{DAC}$ may be arranged to be able to cope with both external input and internal setting by incorporating a selector 43 inside the charging control circuit 10 as illustrated in FIG. 9.

The detection target is not limited to overshoot of the battery voltage $V_{BATT}$, but may be undershoot.

The feedback control function of the adaptor voltage $V_{IN}$ does not necessarily need to be incorporated on the AC adaptor 4 side, but may be provided on the electronic equipment 2 side.

The monitoring of errors is not limited to by the method and the monitoring node described in the embodiment, and those of various kinds may be adopted even if they are not explicitly described herein.

The kind of the battery 9 is not limited to the lithium ion type, and those of various kinds may be adopted.

In the case of a comparator which compares the magnitude of two values, the monitoring part is not limited to the overvoltage protection circuit (OVP 28) as that of the present example, the kind thereof is not limiting provided that it may compare the magnitude of two values. Moreover, the monitoring part may adopt those of any types without being limited to such kind of comparator, provided that it may determine the presence and absence of overvoltage.

The overshoot protection circuit 27 may have a circuit configuration in which High and Low levels of the signal outputted from each logic circuit are reversed with respect to the configuration of the aspects of the Applicant's invention.

The AND circuit 31 is not necessity, and the on-off of the transistor Td3 may be controlled directly by the output signal of the OVP 28.

The node to which the voltage monitoring node is switched upon the occurrence of overvoltage is not necessarily limited to the supply node of the system voltage $V_{SYS}$, and may adopt, for example, the supply nodes of the driving voltage $V_{DC}$ and the power supply voltage $V_{AC}$.

The function to mask the control of the current-voltage conversion circuit 20 at the time of switching the voltage monitoring node is not necessity and the switch $K_{s3}$ may be removed omitting this function.

The control command is not necessarily limited to a current value and may be outputted as for example a voltage value.

When the control current $I_{ADFC}$ is not supplied, the AC adaptor 4 may be one of those which output a minimum voltage of the adaptor voltage $V_{IN}$. In that case, when the AC adaptor 4 electrically connected to the external power source 3 is electrically connected to the electronic equipment 2, since at this time the control current $I_{ADFC}$ is "0", no voltage is supplied to the electronic equipment 2. Thereby, it may become possible to prevent an inrush current from flowing to the battery 9.

The electronic equipment 2 is not necessarily limited to personal computers, and the kind thereof is not limiting provided that it may be driven by the AC adaptor 4 and includes a battery 9.

According to the above described embodiment, the degradation of battery is suppressed to a small extent.

Although the embodiment of the present invention are numbered with, for example, "first," "second," or "third," the ordinal numbers do not imply priorities of the embodiment. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A charging circuit comprising:
    a monitoring part configured to monitor a battery voltage applied to a battery at a supply node of the battery voltage and configured to output an overvoltage signal when the battery is in an overvoltage condition;
    a protection part configured to electrically disconnect the battery from an adaptor when receiving the overvoltage signal; and
    a switch which, when the battery is electrically disconnected from the adaptor, switches a monitoring node for monitoring an adaptor voltage outputted from the adaptor, from the supply node of the battery voltage to a supply node of a system voltage, which is applied to a system electrically connected with the battery and the adaptor and is different from the supply node of the battery voltage, based on the overvoltage signal to cause a control command for controlling the adaptor voltage based on the system voltage to be outputted.

2. The charging circuit according to claim 1, wherein the adaptor is configured to adjust the adaptor voltage when it receives the control command.

3. The charging circuit according to claim 1 comprising:
    a breaking part configured to electrically disconnect a command output circuit from a control circuit when the monitoring node is switched by the switch;
    wherein the command output circuit is configured to output the control command based on the overvoltage signal issued from the monitoring part, and wherein the control circuit is configured to manage the operation of the command output circuit.

4. The charging circuit according to claim 1, wherein the switch comprises:
    a battery-side switching contact electrically connected between a voltage monitoring circuit configured to monitor an output state of the adaptor voltage and the supply node of the battery voltage; and
    a system-side switching contact electrically connected between the voltage monitoring circuit and the supply node of the system voltage, wherein, when the battery and the adaptor are electrically connected, the switch is configured to turn off the system-side switching contact, based on the overvoltage signal, while keeping the battery-side switching contact on so that the supply node of the battery voltage supplies as the monitoring node, and, when the battery and the adaptor are electrically disconnected, the switch is configured to turn on the system-side switching contact, based on the overvoltage signal, while keeping the battery-side switching contact off so that the supply node of the system voltage supplies as the monitoring node.

5. The charging circuit according to claim 1, wherein the switch comprises:
    a connection contact electrically connected between a voltage monitoring circuit configured to monitor an output state of the adaptor voltage and a command output circuit configured to output the control command; and
    a capacitor electrically connected in parallel between the command output circuit and the connection contact, wherein, when the battery and the adaptor are electrically connected, the switch is configured to feed the output of the voltage monitoring circuit to the command output circuit by turning on the connection contact based on the overvoltage signal to cause the command output circuit to generate the control command, and, when the battery and the adaptor are electrically disconnected, the switch turns off the connection contact based on the overvoltage signal and clamps the control command.

6. The charging circuit according to claim 1, wherein the monitoring part is configured to compare the battery voltage from the supply node of the battery voltage with a reference voltage to detect overvoltage to the battery, and wherein the reference voltage is input to the charging circuit.

7. The charging circuit according to claim 1, wherein the monitoring part is configured to compare the battery voltage from the supply node of the battery with a reference voltage to detect overvoltage to the battery, and wherein the reference voltage is generated within the charging circuit.

8. The charging circuit according to claim 1, wherein the protection part is provided between the supply node of the battery voltage and the supply node of the system voltage.

* * * * *